United States Patent [19]

Kobayashi et al.

[11] Patent Number: 5,062,119
[45] Date of Patent: Oct. 29, 1991

[54] DETECTION OF BROKEN COATED FUEL PARTICLES IN CERAMIC COATING LAYER

[75] Inventors: Fumiaki Kobayashi; Kosaku Fukuda, both of Tokai, Japan

[73] Assignee: Japan Atomic Energy Research Institute, Tokyo, Japan

[21] Appl. No.: 622,782

[22] Filed: Dec. 5, 1990

[30] Foreign Application Priority Data

Feb. 2, 1990 [JP] Japan .................................. 2-022078

[51] Int. Cl.$^5$ ...................... G01N 25/72; G21C 17/06
[52] U.S. Cl. ..................................... 374/5; 73/150 R; 374/57; 376/251
[58] Field of Search ................ 73/150 R, 45.5; 374/5, 374/57; 376/251, 253

[56] References Cited

U.S. PATENT DOCUMENTS 2,851,338  9/1958  Johns et al. ......................... 376/251
3,830,094  8/1974  Leger ..................................... 374/5
4,591,478  5/1986  Cohen et al. ........................ 376/253

FOREIGN PATENT DOCUMENTS 245127    2/1966   Austria .............................. 73/150 R
1253636  11/1971   United Kingdom ................ 376/251

Primary Examiner—William A. Cuchlinski, Jr.
Assistant Examiner—W. Morris Worth
Attorney, Agent, or Firm—Oblon, Spivak, McClelland, Maier & Neustadt

[57] ABSTRACT

A method of detecting coated fuel particles having a broken ceramic coated layer in coated fuel particles for high-temperature gas-cooled reactor which comprises permeating a liquid into the interior of the coated fuel particles having a broken ceramic coated layer through a broken portion of the ceramic coated layer, thereafter heating it to expand the liquid by evaporation pyrolysis thereby breaking the ceramic coating layer or the whole body of coated fuel particle by pressure generated.

1 Claim, No Drawings

DETECTION OF BROKEN COATED FUEL PARTICLES IN CERAMIC COATING LAYER

BACKGROUND OF THE INVENTION (a) Field of the Invention

The present invention relates to a method for detecting broken particles in ceramic coating layer of coated fuel particles for high-temperature gas-cooled reactor.

(b) Description of the Prior Art

As a detection method of broken ceramic coating layer of coated fuel particles for high-temperature gas-cooled reactor (referred to "coated particles" for short), a method (Burn-leach method) in case of using silicon-carbide for the third coating layer which comprises burning coated particles in air to remove a carbon layer which is the fourth coating layer, thereafter boiling it in a solution of nitric acid to elute uranium and determining the uranium and a method (Mercury injection method) which comprises, after removing the fourth coating layer, that is a carbon layer, by burning, putting coated particles into mercury, applying pressure of above several tens MPa thereto from the exterior to inject mecury into the interior of broken particles and examiming the existence of mercury in the coated particles by X-ray photographing have hitherto been utilized.

However, for the present, there is not any suitable method for the detection of broken particles in case of using zirconium carbide for the coating layer.

The prior Burn-leach method has such a problem that it is necessary to burn the carbon layer of the first and second coating layers through the broken portions of silicon carbide, but, in case the broken portion is small, the first and second coating layers cannot be burned even if burning for a long time.

The mercury injection method has developed for the purpose of solving the problem in the Burn-leach method, however, the method itself is complicated besides mercury used is a poisonous material, an apparatus of generating high pressure is necessary and a X-ray generating apparatus is required.

SUMMARY OF THE INVENTION

An object of the invention is to provide a method for detecting a ceramic coating layer broken in coated particles for high-temperature gas-cooled reactor, in which the above described problems have been solved.

DESCRIPTION OF THE PREFERRED EMBODIMENT

As the result of applying themselves to research for attaining the purpose, the present inventors have attained the method of the present invention which comprises detecting coated particles broken in a ceramic coated layer by permeating a easy permeatable liquid into the interior of broken particle through a small broken portion of ceramic coating layer, thereafter radically heating it to evaporate or pyrolysis the liquid contained in the interior of coated particle and thereby generating pressure to break the coating layer or the whole body of coated particle thereby.

That is, the present invention is to break a ceramic coating layer having a broken point or the whole body of particle coated with such layer by the volume expansion of liquid permeated into the interior of coated particle through the broken portion of ceramic coating layer by evaporation or pyrolysis thereof.

EXAMPLE

The present invention will be explained more in detail with an example.

This Example was held on two kinds of silicon carbide coated particle and zirconium carbide coated particle which is considered to be frequently broken in zircomium carbide coating layer, using diiodide methane as a permeating liquid at a heating temperature of 900° C.

The result was as shown in the following Table 1:

TABLE 1

| | Number of particle having broken coating layer/ Number of sample | |
|---|---|---|
| Sample | Prior Burn-leach method | Present invention method |
| Silicon carbide coated particle | 0/1408 | 24/1967 |
| Zirconium carbide coated particle | Cannot be tested | 20/868 |

The detection method of the present invention showing an example employing a group of coated particle containing coated particles having broken in ceramic layer as an inspection object and using diiodide methane liquid as a permeating liquid will be shown by a flow sheet as follows:

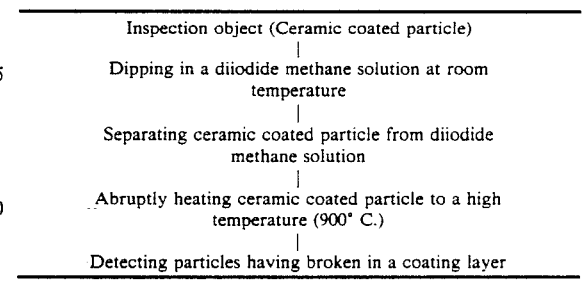

Any other liquid permeatable into a small broken portion may employed as a permeating liquid although diiodide methane solution was used in the Example.

The present invention can be applied to a method of detecting a small defect in a ceramic coating other than coated particles as the object of the present invention, and also, in such a case spherical particles having a defect exist, the present invention can be applied to break the defective particle for separating normal spherical particles therefrom.

What is claimed is:

1. A method of detecting coated fuel particles having a broken ceramic coated layer in coated fuel particles for high-temperature gas-cooled reactor which comprises permeating a liquid into the interior of the coated fuel particles having a broken ceramic coated layer through a broken portion of the ceramic coated layer, thereafter heating it to expand the liquid by evaporation pyrolysis thereby breaking the ceramic coating layer or the whole body of coated fuel particle by pressure generated.

* * * * *